March 21, 1950
D. D. CRANDELL ET AL
MINERAL WOOL FIBERS AND METHOD
OF PREPARING SAME
Filed June 3, 1944
2,501,316
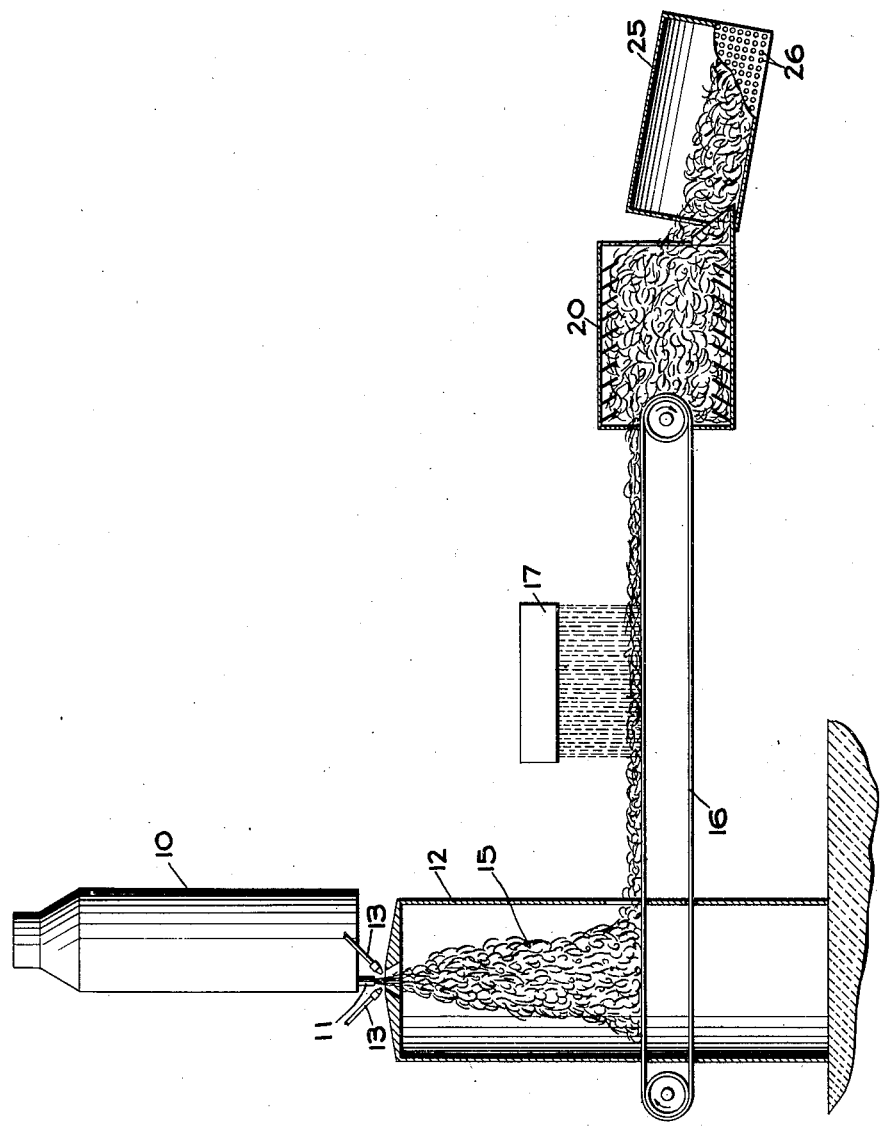
INVENTOR
DEAN D. CRANDELL AND DAVID W. BURNETT
BY
Beau, Brooks, Buckley & Beau.
ATTORNEYS Patented Mar. 21, 1950

2,501,316

UNITED STATES PATENT OFFICE 2,501,316

MINERAL WOOL FIBERS AND METHOD OF PREPARING SAME

Dean D. Crandell, Buffalo, N. Y., and David W. Burnett, Alexandria, Ind., assignors to National Gypsum Company, Buffalo, N. Y.

Application June 3, 1944, Serial No. 538,570

2 Claims. (Cl. 117—126)

The present invention relates to mineral wool products and particularly to loose or granulated mineral wool possessing improved resistance to wetting and improved covering power.

Granulated rock wool or mineral wool has been produced in general as an insulation material and in such use is normally blown into those portions of dwellings, generally residential buildings, which it is desired to insulate. Other than the insulation value inherent in the mineral wool, it is desired that the product possess two well-defined characteristics; the one is resistance to wetting so that condensation of moisture, which has breathed into that portion of the building containing the mineral wool as insulation, will not wet the mineral wool and cause the same to settle, become soggy and lose its insulation value. The second characteristic is sufficient fluffiness which is retained as a permanent characteristic so that a maximum coverage per unit weight of the mineral wool may be obtained when the wool is blown into confined spaces in the usual manner.

Many attempts have been heretofore to provide the mineral wool with non-wetting characteristics. Thus, the wool has been treated with oils and the like which tend to prevent dusting and also produces some non-wetting characteristics. Many other materials such as asphaltum, mineral spirit, soluble waxes, solutions of resins and even sodium silicate may be employed as water-proofing coating agents. None of these proposals has been accepted as entirely satisfactory and all suffer certain disadvantages which the present invention overcomes.

It is an object of the present invention to provide a method for water-proofing mineral wool without the necessity of employing either expensive or hazardous solvents.

It is also an object of the invention to provide mineral wool possessing a greater coverage per unit weight than can be obtained from mineral wool not so treated.

It is a further object of the invention to provide a procedure wherein solid, water insoluble non-wetting agents may be uniformly distributed upon and caused to adhere to the individual fibers of loose mineral wool.

The figure appended hereto is a diagrammatic representation of equipment suitable for practicing the method by which the improved mineral wool can be obtained. It will be understood that this drawing is illustrative only and is not limitative of the equipment or apparatus employed.

In accordance with the present invention, molten rock is prepared in the usual way for the preparation of mineral wool in the cupola or furnace 10. A stream of the molten rock is permitted to discharge from spout 11 downwardly into the fibrating chamber 12.

The molten rock is fibrized in any conventional way and, in the drawing, steam jets 13 are shown situated with respect to discharge spout 11 so that steam or heated air, discharged from jets 13, impinge upon the stream of molten rock from cupola 10 causing the stream to swirl out out into thin fibers into fibrating chamber 12. The fibers are shown at 15. The fibers are cooled in any conventional way in fibrating chamber 12 and, in the drawing, an endless belt 16 is shown as cooling the wool so prepared and removing it from the fibrating chamber. The mineral wool so produced is then taken to any desired treating or operating station as, for instance, drying ovens (not shown) if required.

The loose mineral wool fibers are, in accordance with the present invention, dusted with a small amount of the special water-proofing material. This material comprises finely divided water insoluble soaps such as the stearates, palmitates, oleates, etc., of the heavy metals including aluminum and zinc. The dry powder in finely divided form and in amount in the neighborhood of about ½ of 1 per cent or less, based on the weight of wool, is dusted upon the loose or granulated wool. As shown in the drawing, this powder may be added to the wool through a dusting sieve 17, suitable provision being made for regulating the amount of powder discharged from the sive in proportion to the speed of travel of belt 16 and the amount of wool thereon.

After the addition of the desired amount of finely divided insoluble metallic soap to the wool, the mixture is passed to a device providing frictional agitation wherein the wool is tumbled about, subjected to surface friction or rubbing and wherein the finely divided insoluble soap distributes itself uniformly over the fibers of mineral wool. At the same time, shot and pellets are broken out from the long light fibers and may be subsequently removed therefrom by sieving. To this end the admixture which has been subjected to the frictional agitator in granulator 20 is discharged into the rotary screen 25 where the shot and granules discharge through orifices 26 permitting the loose or granulated wool to discharge from the lower end of rotary screen 25. Substantially no excess metallic soap is discharged with the shot since the finely divided powder has distributed itself evenly and uniformly over the mineral wool fibers and adheres to these fibers during the agitation.

While it is not understood why this insoluble powder remains upon the surface of the fibers as a coating, it is believed that during the frictional agitation, surface forces come into play, probably of an electrical nature, which cause the insoluble soap particles to be attracted to the surface of the wool fibers.

However, whatever may be the theory, the powder is retained on the surface, is not washed off, since the treated wool will float on water, will not shrink, pack or become soggy when water is poured upon a bulk of the wool.

In order to increase the fluffying characteristics of the wool there should be added thereto a small amount of powdered limestone flour. This addition should be made prior to entrance of the wool to the granulator. The addition of limestone flour may precede, follow or be coincident with the addition of the insoluble soap. The flour shall exceed 0.25% of the weight of the wool to obtain the full advantage thereof. Additions of greater than 2.5% do not produce a corresponding increase in the fluffiness of the wool.

In general the solid additions of soap and limestone flour should be made with finely ground material. The soap should pass 100 mesh and the ground limestone pass 100 mesh and 90% through 200 mesh. However, the finer the material is ground the better, and 95% through 325 mesh is recommended.

The resultant wool is coated with finely divided discrete particles of insoluble soap and limestone, is water resistant and fluffy and when blown produces a more bulky stable form than wool not so treated. Thus, where the untreated product will produce on the average a coverage of 1800 square feet per ton, at a thickness of 3 inches, the wool treated in accordance with the present invention will provide a coverage of about 2400 square feet per ton at a 3 inch thickness.

It will thus be seen that, in accordance with the present invention, treated mineral wool is provided which, by reason of its lower density, when blown, provides an improved insulation material and in addition provides a mineral wool that does not settle in the presence of excessive moisture and one which permits of additional coverage per unit weight of material.

What is claimed is:

1. The method of preparing loose mineral wool fibers which comprises adding to a bulk of mineral wool in the neighborhood of 0.5% of a dry finely divided insoluble soap and from 0.25% to 2.5% of limestone flour and then distributing the soap and flour uniformly over and causing it to adhere to the fibers by frictional agitation.

2. Loose mineral wool fibers containing upon the surface thereof about 0.5% of its weight of a water insoluble soap and from 0.25% to 2.5% of limestone flour, the soap and flour being present on the surface as finely divided discrete particles.

DEAN D. CRANDELL.
DAVID W. BURNETT.

REFERENCES CITED

The following references are of record in the file of this patent:

UNITED STATES PATENTS

| Number | Name | Date |
|---|---|---|
| 758,244 | Goldman | Apr. 26, 1904 |
| 1,213,118 | Lynch | June 16, 1917 |
| 1,564,306 | Fantz | Dec. 8, 1925 |
| 2,003,335 | Black | June 4, 1935 |
| 2,022,750 | Toohey | Dec. 3, 1935 |

FOREIGN PATENTS

| Number | Country | Date |
|---|---|---|
| 490,877 | Great Britain | Aug. 23, 1938 |